United States Patent [19]

Ingeneri

[11] 3,919,788

[45] Nov. 18, 1975

[54] QUIZ SHEET AND METHOD AND APPARATUS FOR PRODUCING SAME

[75] Inventor: Frank Ingeneri, Santa Clara, Calif.

[73] Assignee: Self Development Inc., San Jose, Calif.

[22] Filed: Apr. 16, 1970

[21] Appl. No.: 29,047

Related U.S. Application Data

[63] Continuation-in-part of Ser. No. 629,604, April 10, 1967, Pat. No. 3,540,138, and a continuation-in-part of Ser. No. 882,420, Dec. 5, 1969, Pat. No. 3,626,608.

[52] U.S. Cl................................... 35/48 B; 35/9 B
[51] Int. Cl.² ........................................ G09B 7/00
[58] Field of Search .................... 35/9 R, 9 B, 48 R

[56] References Cited
UNITED STATES PATENTS

| | | | |
|---|---|---|---|
| 2,720,038 | 10/1955 | Clark | 35/9 |
| 2,838,847 | 6/1958 | Zalkind | 35/9 |
| 3,327,405 | 6/1967 | Ingeneri | 35/9 |
| 3,401,472 | 9/1968 | Lord | 35/48 B |

Primary Examiner—Robert W. Michell
Assistant Examiner—John H. Wolff
Attorney, Agent, or Firm—Ben J. Chromy; Gerald L. Moore

[57] ABSTRACT

A quiz sheet and method and apparatus for producing same. The quiz sheet comprises an array of questions and multiple choice answers arranged in a predetermined format and it also includes perforations arranged in predetermined positions for controlling the operation of an educational and amusement device of the type disclosed in application Ser. No. 882,420 filed Dec. 5, 1969. Selected ones of these perforations are arranged in a predetermined code and cooperate with the programming switch of the device so that the device is properly programmed to correspond with the questions and answers provided on the sheet. A code programmer is used to position the correct code on the question sheet, and for this purpose the question sheet is placed on the programmer so that the answers to the questions are aligned with certain legends on the programmer. These legends correspond to legends of the program code arranged on the programmer overlapping the top of the question sheet. The operator places marks on the top of the question sheet opposite the legends on the programmer which correspond to the correct answers of the multiple choice answers. These marks appear at the top margin of the question sheet and are used to locate the positions of the programming perforations to be provided to the sheet. The question sheet is then ready to be used on an electronic quizzer the programming of which is controlled by the code perforated into the top of the question sheet. The question sheet is also provided with at least one perforation which controls whether the device is to be programmed for questions having multiple choice four answers or multiple choice two answers.

2 Claims, 9 Drawing Figures

INVENTOR.
FRANK INGENERI
BY *Allen and Thromy*
ATTORNEYS

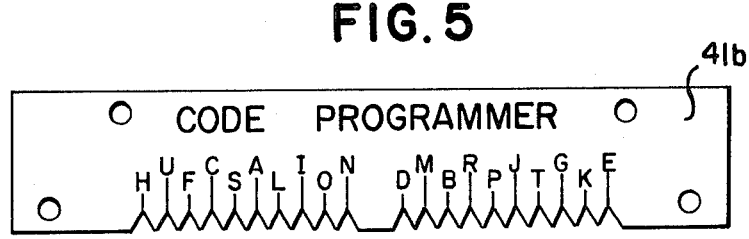
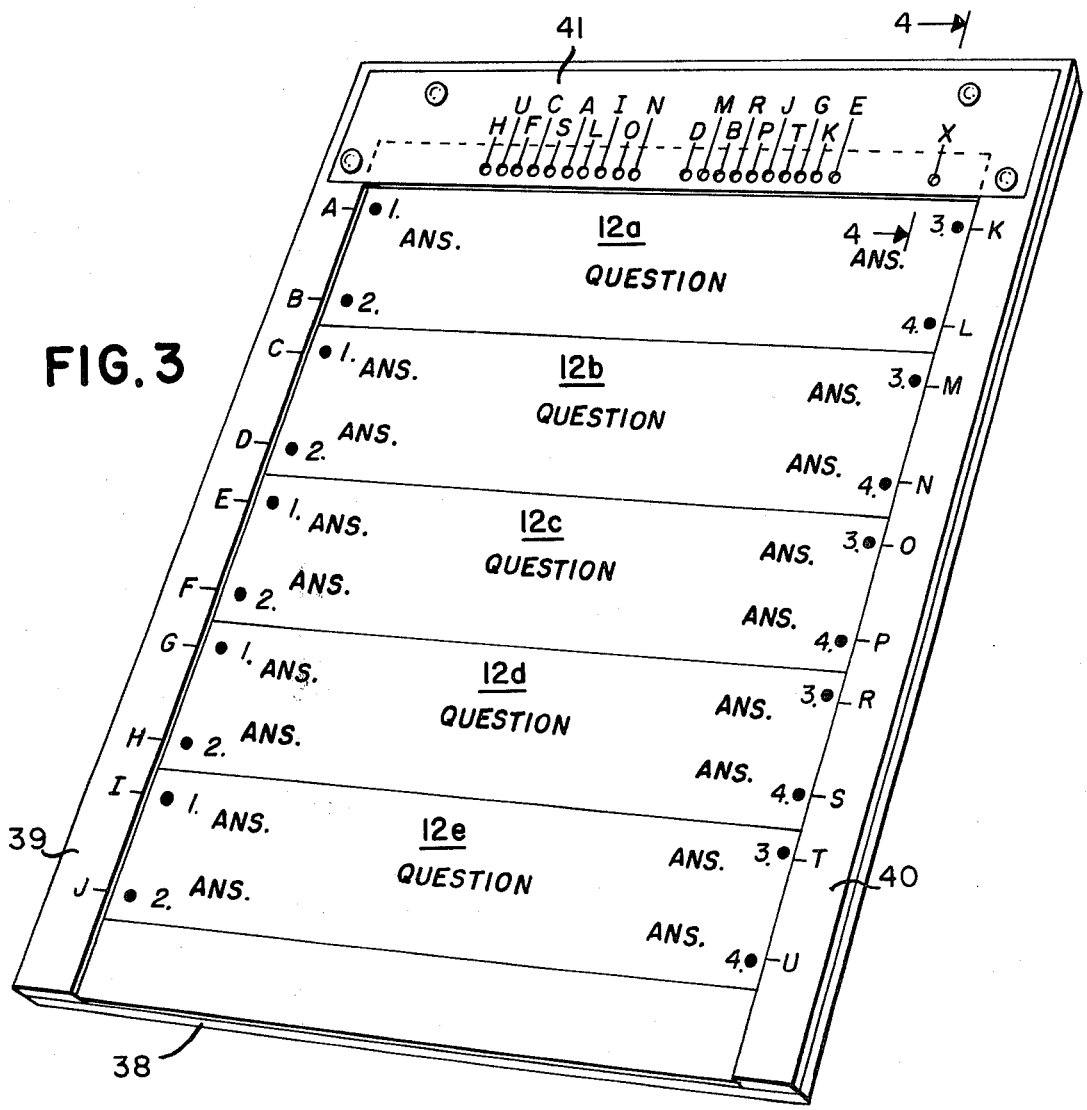
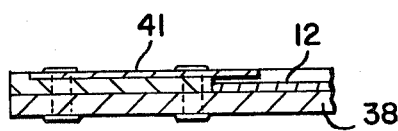

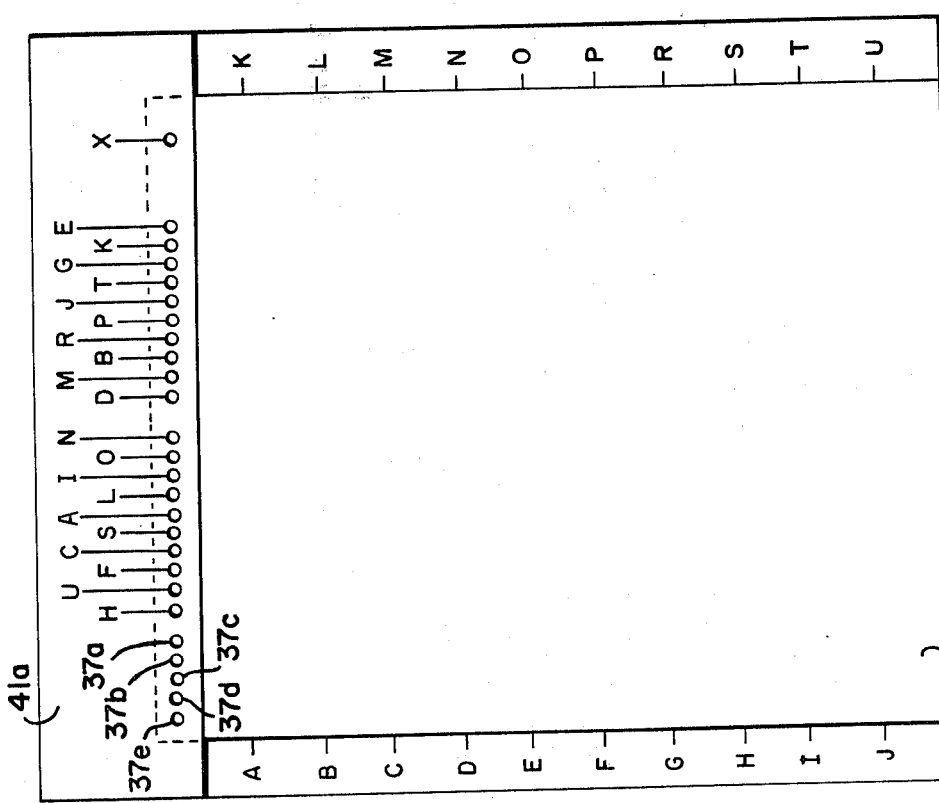

QUIZ SHEET AND METHOD AND APPARATUS FOR PRODUCING SAME

DESCRIPTION OF THE INVENTION

This application is a continuation-in-part of my application Ser. No. 629,604 filed Apr. 10, 1967, now U.S. Pat. No. 3,540,138 for SYSTEM FOR EVALUATING STUDENT'S EXAMINATIONS, and my application Ser. No. 882,420 filed Dec. 5, 1969 now U.S. Pat. No. 3,626,608 for ELECTRONIC EDUCATIONAL AND AMUSEMENT DEVICE.

This invention relates to a quiz sheet and a device for providing a program code thereto to adapt it for use in an electronic device.

An object of this invention is to provide a quiz sheet and a device to facilitate producing such quiz sheets so that they may be used with an electronic device such as disclosed in my application for patent Ser. No. 882,420 filed Dec. 5, 1969.

Another object of this invention is to provide a method and apparatus for producing a quiz sheet for use with an electronic educational or amusement device which is programmed in accordance with a code provided to the question and answer or quiz sheet.

Another object of this invention is to provide a device to be used to position the correct code on sheets of paper bearing questions and multiple choice answers in predetermined order thereon, said multiple choice answers being aligned with legends provided on sides of this device, said device also being provided with a member at the top thereof bearing corresponding legends adjacent holes or slots therein; the operator preparing the program code is guided by the legends on said member in placing marks on the top of said sheet opposite the legends which correspond to the correct answers of the multiple choice answers and these marks guide the operator in thereafter perforating the program code into the sheet at the proper places for use in programming and otherwise controlling the electronic device.

Other and further objects of this invention will be apparent to those skilled in the art to which it relates from the following specification, claims and drawing in which, briefly:

FIG. 3 is a perspective view of a board employed for the preparation of the program code on a quiz sheet;

FIG. 4 is a sectional view taken along the lines 4—4 of FIG. 3;

FIG. 5 is a view of a modified code positioning device adapted to be employed with the board shown in FIG. 3;

FIG. 6 is a view of a quiz card programmed on the board shown in FIG. 3 for choice two answers;

FIG. 7 is a view of a quiz card programmed on the board shown in FIG. 3 for choice four answers;

FIG. 8 is a view of a board employed for programming a quiz card for use in a sequence of cards; and FIG. 9 is a view of a quiz card programmed on the board shown in FIG. 8 for use in a predetermined sequence.

Figure 1:
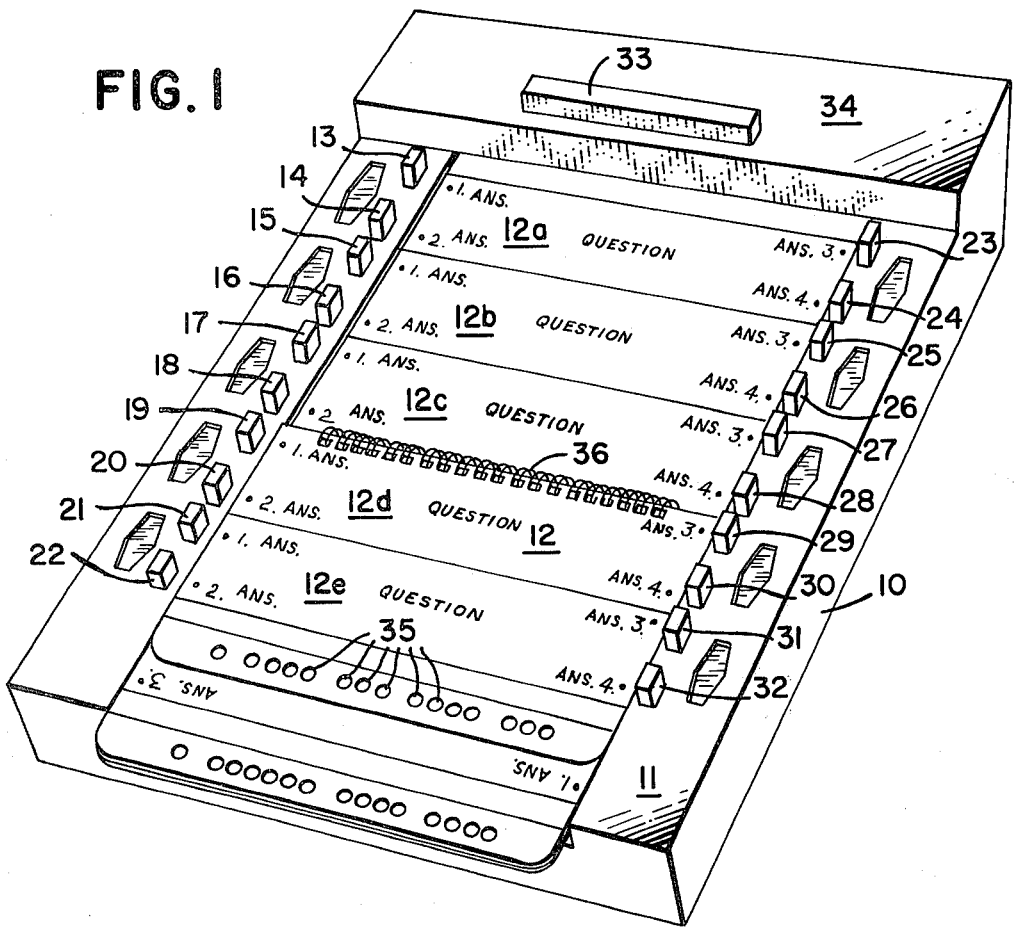
FIG. 1 is a perspective view of a device such as is disclosed in application Ser. No. 882,420 filed Dec. 5, 1969, with a multiple page quiz sheet positioned thereon ready for operation of the device.

Referring to the drawing in detail reference numeral 10 designates an electronic device of the type described and disclosed in my application Ser. No. 882,420 filed Dec. 5, 1969. This device is provided with a top panel 11 which is slightly recessed to receive the question and answer sheets 12 which have a plurality of questions printed thereon and a multiple choice of answers corresponding to each of the questions. The questions are printed on delineated areas 12a, 12b, 12c, 12d and 12e of the sheet and the answers associated with the questions are arranged in arrays so that an answer is opposite and aligned with each of the push button switches 13 to 32, inclusive.

This electronic device is also provided with a programming bar 33 which is adapted to be manually depressed and which is positioned in a recess formed in the escutcheon 34. The programming bar 33 actuates the programming switches which are positioned under the escutcheon 34 and selected ones of these switches are adapted to be closed depending upon the array of program apertures which form the program code and which are positioned in the top portion of the question and answer sheet 12 that is positioned for use in the electronic device.

The question and answer sheets 12 are reversible, that is they are provided with questions and answers on both sides thereof. When a certain question and answer sheet is being used in this device the program code perforations of that sheet are inserted under the escutcheon 34 so that the program code perforations corresponding to the correct answers on the top of the sheet are aligned with the correct programming switches under the escutcheon. When the question and answer sheet is turned over so that the questions and answers on the other side of the sheet are presented for use then the perforations shown at 35 are presented under the program switches to be activated when the program bar 33 is depressed so that the circuits to the device memory are closed through these perforations.

Figure 2:
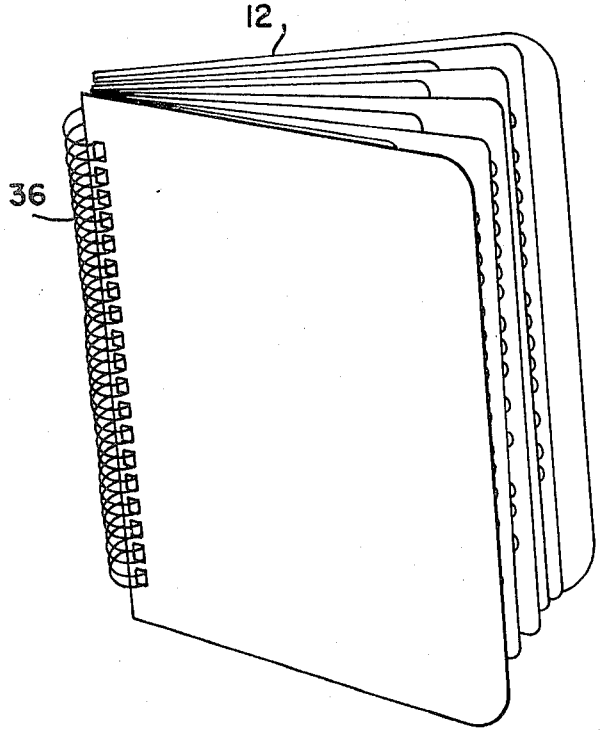
FIG. 2 is a view showing a multiple quiz sheet adapted to be employed with the device shown in FIG. 1.

The question and answer sheets shown in FIG. 1 in position on the electronic device 10 are assembled in book form as shown in FIG. 2 and are provided with a binding 36.

In order to locate the programming perforations properly on the question and answer sheet there is provided a board 38 shown in FIG. 3 having side rails 39 and 40 and also having a top member 41. The side rail 39 is provided with an array of marks designated by the letters A to J, inclusive, and the other side rail 40 is provided with an array of marks designated by the letters K to U as shown. The top member is provided with perforations arranged in three groups. The left hand group includes the perforations designated by the capital letters H, U, F, C, S, A, L, I, O, N. The second group of perforations is designated by D, M, B, R, P, J, T, G, K, E. The first and second groups of perforations are employed in providing the programming code to the question and answer sheets.

The perforation designated by the character X is provided to the question and answer sheet when it is desired to use the electronic device in connection with multiple choice two answers instead of multiple choice four answers as described in my application Ser. No. 882,420 filed Dec. 5, 1969. When no perforation is provided to the question and answer sheet at the position X, then the circuit of the electronic device is connected to be used with multiple choice four answers and when a perforation is provided at position X the circuit of the electronic device is connected for use with multiple choice two answers.

Figures 6, 7:
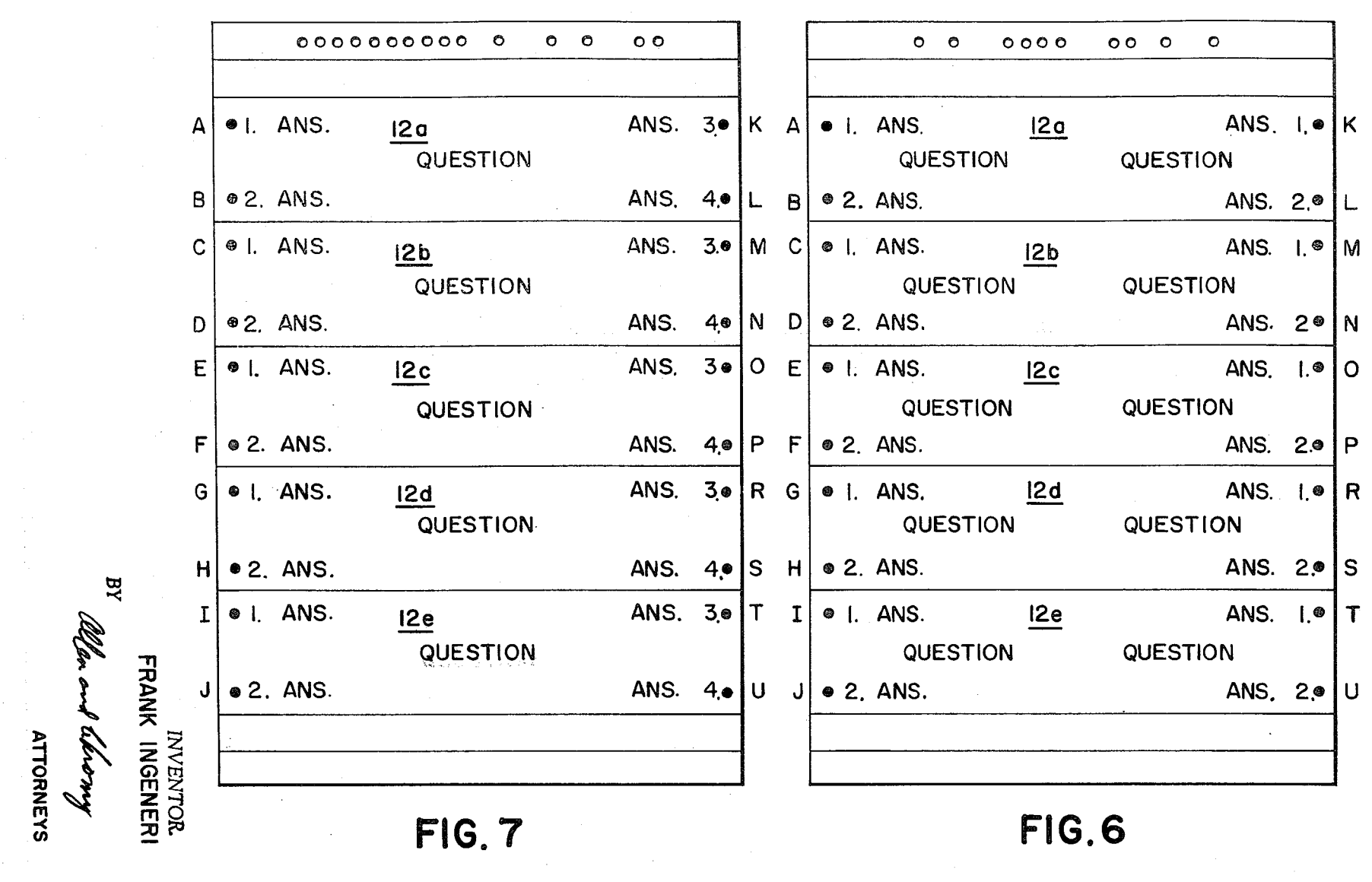

In FIG. 6 there is shown a question and answer or quiz card that is programmed for choice two answers. On this card there are two columns of questions, one of the columns being a left hand column and the other a right hand column. Thus, in the space 12a there are two questions, one from each of these columns and the left hand question has associated therewith a choice of two answers. One of these answers is aligned with the legend A on the programming board 38 shown in FIG. 3 and the other of the answers is aligned with the legend B. In the case of the right hand question one of the possible answers is aligned with the legend K and the other of the questions answers is aligned with the legend L. The legends A and B correspond to the switches 13 and 14 of the electronic device shown in FIG. 1 and the answers aligned with the legends K and L are aligned with the switches 23 and 24, respectively. Likewise the spaces 12b, 12c, 12d and 12e of the card each have a question on the left hand side and another one on the right hand side thereof. Each of these questions has a selection of two answers positioned opposite the letter legends on the sides of the board 38.

In providing the program perforations at the top of the quiz card the operator must, of course, know which of the two answers associated with each question is the correct one. In considering the questions in the left hand column of the quiz let it be assumed that the answers aligned with the legends A, D, F, H and I are the correct ones to the questions in this column. The operator will then place marks in the holes A, D, F, H and I at the top of the device in panel 41. It is also assumed that in the case of the right hand column questions, the correct answers are aligned with the letters L, M, O, R and T, the operator will then place marks on the card through the holes identified by letters L, M, O, R and T. Since this is a quiz card having choice two answers a mark will also be placed in the perforation designated by the letter X. The card is then removed from the board 38 and the program perforations are placed at the top of the part of the card corresponding to the marks listed above. The card is now correctly programmed for use in the electronic device shown in FIG. 1.

In FIG. 7 there is shown a question and answer or quiz card programmed for choice four answers and the program on this card is developed in the following manner. Only one column of questions is provided to this card and these questions may be located in the central areas of the spaces 12a, 12b, 12c, 12d and 12e. A choice of four answers is provided to each of these questions, the selection of four answers provided to the question in the first space 12a is arranged so that one choice is opposite the legend A, a second choice is opposite the legend B, a third choice is opposite the legend K and a fourth choice is opposite the legend L. Likewise, in the case of the second question provided in space 12b the first choice is opposite the legend C, the second choice is opposite the legend D, the third choice is opposite the legend M, and the fourth choice is opposite the legend N. Similar answer choices are arranged to the questions in spaces 12c, 12d and 12e.

If it is assumed that the correct answers to the questions in spaces 12a, 12b, 12c, 12d, and 12e are opposite the legends A, N, O, H and U then the operator will place marks in the holes in panel 41 corresponding to the letters A, N, O, H, and U. Since the electronic apparatus shown in FIG. 1 is provided with two sets of storage memories one of which sets corresponds to the switches 13 to 22 and the other of which sets corresponds to the switches 23 to 32 then it is apparent that in the choice four mode of operation each question will have associated with it two memories, one on the left hand side and the other on the right hand side of the device. In the case of the question in space 12a it was assumed that the correct answer to the question was that aligned with the legend A. Therefore the memory on the left hand side is the operative memory and that located on the right hand side is inactive. In order to neutralize or make inactive the memory on the right hand side, perforations must be provided in the program at the top of the quiz card opposite the legends K and L. Likewise, in the case of the question in space 12b the correct answer was assumed to be aligned with the legend N on the right hand side. Therefore the memory on the left hand side is inactive and perforations must be provided in the program at the top of the card opposite the legends C and D. In the case of the question in the space 12c the correct answer was assumed to be aligned with the legend O. Therefore, the right hand memory is operative and the left hand memory is inactive. Perforations must therefore be provided to the program at the top of the card opposite the legends E and F. The question in space 12d was assumed to have the correct answer thereto aligned with the legend H on the left hand column. Therefore, the right hand memory is inactive and program perforations must be provided at the top of the card opposite the letters R and S. The question in space 12e was assumed to be provided with a correct answer opposite the legend U in the right hand side. Therefore, the memory on the left hand side is inactive and accordingly the program at the top of the card must include perforations corresponding to the letters I and J. Also, since this is a choice four quiz card no perforation is provided at the aperture X so that the circuit of the electronic device is connected to accommodate choice four quiz as described in my application Ser. No. 882,420.

FIG. 8 illustrates a board 38a similar to that shown in FIG. 3 in that it is provided with a top panel 41a including the programming apertures A to U, inclusive, and the multiple choice aperture X which are included in the panel 41. In addition the aperture panel 41a is provided with a plurality of sequence apertures 37a to 37e, inclusive, so that the card 12' programmed on the board 38a may be used in the right sequence in conjunction with the electronic examination recording device such as is disclosed in my application Ser. No. 629,604 filed Apr. 10, 1967. The question and answer arrangement on this card may be the same as the arrangement provided to the card 12 previously described. However, in using this quiz card in conjunction with the examination recording device it is desirable to use these quiz cards in a certain predetermined sequence, so that the results on these quiz cards may be properly recorded by this device. Thus, the first card in a sequence of cards is provided with a perforation at 37a, the second card is provided with a perforation at 37b, the third card is provided with a perforation at 37c, the fourth card is provided with a perforation at 37d and the fifth card is provided with a perforation at 37e. These perforations cooperate with the sequence switches in the examination recording device so that the answers given by the student to the various questions on the cards may be properly recorded as described in my application Ser. No. 629,604. It is of course obvious that in cases where more than five cards are to be used in a sequence then additional perforations are provided thereto so that all of the cards in the sequence may be accommodated.

While I have shown and described a preferred form of the invention, it will be understood that the invention is capable of variation and modification from the form shown so that the scope thereof should be limited only by the proper scope of the claims appended hereto.

What is claimed is:

1. In an article of manufacture of the class described the combination comprising a member having an array of legends arranged in a predetermined sequence, a sheet with a predetermined number of questions recorded thereon, each of said questions having a choice of answers associated therewith and only one of said answers being correct, said member having means for receiving said sheet so that said answers are positioned opposite selected ones of said legends when said sheet is placed on said member in a predetermined orientation, means at the upper portion of said member having recorded thereon a second array of legends which have a predetermined relation to said first mentioned array of legends, said second array of legends also being arranged in a predetermined sequence, the top of said sheet being adapted to be placed adjacent to said second array of legends so that marks may be placed on the top of said sheet opposite said second array of legends which correspond to said first mentioned legends which are opposite the correct answers to said questions, said means at the upper portion of said member being provided with an additional legend which is identified with different multiple choices of answers to said questions, said sheet being marked opposite said additional legend when the answers to said questions are of a predetermined multiple choice.

2. In an article of manufacture of the class described the combination comprising a member having an array of legends arranged in a predetermined sequence, a sheet with a predetermined number of questions recorded thereon, each of said questions having a choice of answers associated therewith and only one of said answers being correct, said member having means for receiving said sheet so that said answers are positioned opposite selected ones of said legends when said sheet is placed on said member in a predetermined orientation, means at the upper portion of said member having recorded thereon a second array of legends which have a predetermined relation to said first mentioned array of legends, said second array of legends also being arranged in a predetermined sequence, the top of said sheet being adapted to be placed adjacent to said second array of legends so that marks may be placed on the top of said sheet opposite said second array of legends which correspond to said first mentioned legends which are opposite the correct answers to said questions, said means at the upper portion of said member comprising a panel having a portion thereof overhanging the top of said sheet when said sheet is placed in predetermined orientation on said member, said panel being provided with a cut away portion adjacent each of the legends in said second sequence.

* * * * *